United States Patent
Wu et al.

(10) Patent No.: US 9,593,965 B2
(45) Date of Patent: Mar. 14, 2017

(54) NON-CONTACT ADJUSTABLE HYSTERETIC MAGNETIC ENCODER

(71) Applicant: NATIONAL CHUNG SHAN INSTITUTE OF SCIENCE AND TECHNOLOGY, Longtan Township (TW)

(72) Inventors: Ruh-Hua Wu, Longtan Township (TW); Chung-Tseng Chang, Bade (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 70 days.

(21) Appl. No.: 14/563,185

(22) Filed: Dec. 8, 2014

(65) Prior Publication Data

US 2016/0161285 A1    Jun. 9, 2016

(51) Int. Cl.

| G01B 7/14 | (2006.01) |
|---|---|
| G01B 7/30 | (2006.01) |
| G01D 5/12 | (2006.01) |
| G01D 5/244 | (2006.01) |
| H02K 35/00 | (2006.01) |
| H02K 1/00 | (2006.01) |
| G01D 5/14 | (2006.01) |

(52) U.S. Cl.
CPC .................................. *G01D 5/145* (2013.01)

(58) Field of Classification Search
CPC ... G01B 7/14; G01B 7/30; G01D 5/12; G01D 5/244; H02K 35/00; H02K 1/00
USPC ............ 324/207.12, 207.13, 207.21, 207.25; 310/46, 68
See application file for complete search history.

(56) References Cited

U.S. PATENT DOCUMENTS

| 2004/0017187 | A1 | 1/2004 | Van Ostrand | |
|---|---|---|---|---|
| 2005/0127762 | A1* | 6/2005 | Miyashita | G01D 5/145 318/400.38 |
| 2010/0225309 | A1* | 9/2010 | Takahashi | G01D 5/145 324/207.25 |
| 2011/0115481 | A1* | 5/2011 | Katou | G01D 5/04 324/207.25 |
| 2011/0156505 | A1* | 6/2011 | Miyashita | G01D 5/145 310/46 |

(Continued)

*Primary Examiner* — Arleen M Vazquez
*Assistant Examiner* — Neel Shah
(74) *Attorney, Agent, or Firm* — Schmeiser, Olsen & Watts, LLP

(57) ABSTRACT

A non-contact adjustable hysteretic magnetic encoder includes a bipolar magnetic block, two magnetic sensing components, a storage, and a controller. After retrieving the current rotation angle by accessing a rotation angle table, the controller determines, by an encoding rule, digital logical values of a first phase signal (A-phase signal) and digital logical values of a second phase signal (B-phase signal) and outputs the digital logical values. The phase difference between a first phase signal and a second phase signal is adjusted, and a hysteresis range, also known as hysteresis angle, is adjusted, according to the grids attributed to the predetermined number of grids before the turning point and the grids attributed to the predetermined number of grids after the turning point. Hence, the non-contact adjustable hysteretic magnetic encoder features enhanced potential of expansion and marked industrial practicability.

5 Claims, 14 Drawing Sheets

(56) References Cited

U.S. PATENT DOCUMENTS

| | | | |
|---|---|---|---|
| 2013/0027028 A1* | 1/2013 | Hohe | ............... G01D 5/145 324/207.11 |
| 2015/0015245 A1* | 1/2015 | Inoue | ............ G01B 7/30 324/207.13 |

* cited by examiner

NON-CONTACT ADJUSTABLE HYSTERETIC MAGNETIC ENCODER

FIELD OF TECHNOLOGY

The present invention relates to encoders, and more particularly, to a non-contact adjustable hysteretic magnetic encoder attained by integration of software and hardware.

BACKGROUND

A conventional automation system usually has sensors mounted on a rotation shaft or a movement shaft to receive feedback signals pertaining to a rotation speed, a new direction, or a displacement in order to effectuate control. A typical sensing signal sensed with a sensor is usually a voltage signal. To allow the voltage signal to be read by the other digital logical components later, it is usually necessary to convert the voltage signal into a digital pulse signal with an encoding program of an encoder and then convert the digital pulse signal into various control signals with a decoder, a counter, or a frequency counter. Furthermore, the control signals thus generated can be used to detect a rotation speed, a new direction, a location, and an angle.

Conventionally, a rotation angle or a linear displacement is detected with magnetic induction between a magnetic sensing component and a magnetic block. The prior art, such as US20040017187, discloses that a sensor for use in sensing rotation or linear displacement comprises a magnetic block and a magnetic field detecting circuit, and further discloses that an angle and a displacement are determined with sine waves generated from two linear Hall elements (LHE), respectively, and defined by a phase difference of 90 degrees. In addition, to allow the LHE to generate a magnetic field which commands a linear relationship with respective to a position, the prior art further discloses that the magnetic block takes on a shape which is so special as to form a multi-pole magnetic block. However, in the course of its displacement, the multi-pole magnetic block takes a journey which depends on its size, and thus the multi-pole magnetic block is subject to a limit in terms of its unexhausted displacement. Given an installation space of a specific volume, the larger the magnetic block, the lesser the unexhausted displacement. As a result, increasing the volume of a device greatly is the only way to augment the range of motion of the device. Another drawback of the multi-pole magnetic block is that it is confronted with strict technical requirements of magnetization, thereby leading to high manufacturing costs of the multi-pole magnetic block.

On the flip side, the aforesaid magnetic induction between the magnetic sensing component and the magnetic block will not occur unless a signal is generated with a Hall switch. The Hall switch must have a built-in Smith triggering delaying circuit for eliminating jitter which might otherwise occur to digital signal conversion, thereby incurring costs.

SUMMARY

It is an objective of the present invention to dispense with a multi-pole magnetic block and thus circumvent the problem with high costs incurred in magnetization of the multi-pole magnetic block.

Another objective of the present invention is to provide a low-cost encoder.

Yet another objective of the present invention is to achieve hysteresis of signals and adjustment of hysteretic angles between the signals without any hysteresis-controlling circuit.

In order to achieve the above and other objectives, the present invention provides a non-contact adjustable hysteretic magnetic encoder, comprising: a bipolar magnetic block disposed at a rotating shaft; two magnetic sensing components configured in a manner to generate two induction signals by sensing a magnetic field of the bipolar magnetic block, wherein the two induction signals differ from each other by a first predetermined phase; a storage for storing a rotation angle table of rotation angles corresponding to the two induction signals and storing a first phase signal code table and a second phase signal code table indicative of states corresponding to a first phase signal and a second phase signal at each said rotation angle; and a controller connected to the two magnetic sensing components and the storage so as to receive the two induction signals, retrieve a rotation angle of the rotating shaft in accordance with the rotation angle table, and determine and output digital logical values of the first phase signal and the second phase signal according to an encoding rule in accordance with the rotation angles in the first phase signal code table and the second phase signal code table, wherein the encoding rule requires the controller to output a first digital logical value as soon as a code of a phase signal is a first state, a second digital logical value as soon as the code is a second state, and a digital logical value corresponding to the preceding code as soon as the code is one of a third state and a fourth state.

In an embodiment of the present invention, the controller outputs, on condition that the code is not preceded by any code, the second digital logical value as soon as the code is the third state and the first digital logical value as soon as the code is the fourth state.

In an embodiment of the present invention, the first phase signal code table and the second phase signal code table are defined in a manner that a range of rotation angles of the first phase signal and the second phase signal is divided into a plurality of cycle of pulses and the cycle of pulses are each divided into a plurality of grids, wherein the cycle of pulses of the first phase signal and the second phase signal differ by a second predetermined phase, wherein every turning point within each cycle of pulse is defined with a hysteresis defining rule, wherein the hysteresis defining rule requires that both the state of the turning point and the state of the grids attributed to the predetermined number of grids before the turning point be defined as the third state when the state of the grids attributed to the predetermined number of grids before the turning point and the grids attributed to the predetermined number of grids after the turning point is the second state, wherein the hysteresis defining rule requires that both the state of the turning point and the state of the grids attributed to the predetermined number of grids before the turning point be defined as the fourth state when the state of the grids attributed to the predetermined number of grids before the turning point and the grids attributed to the predetermined number of grids after the turning point is the first state.

In an embodiment of the present invention, the bipolar magnetic block is a radial magnetization a magnetic block or an axial magnetization a magnetic block.

In an embodiment of the present invention, the first predetermined phase and the second predetermined phase differ from each other by a phase difference of 90 degrees.

In an embodiment of the present invention, each said magnetic sensing component is a linear Hall element (LHE).

Accordingly, the present invention is characterized in that: a low-cost non-contact adjustable hysteretic magnetic encoder is attained by integration of software and hardware, requiring just a magnetic block, two magnetic sensing components, and a controller, so as to bring about a hysteresis effect within a range before and after the turning point of a pulse wave by means of 4-state encoding. Hence, the non-contact adjustable hysteretic magnetic encoder of the present invention dispenses with any multi-pole magnetic block and thus provides the solution to the known problems with magnetization of multi-pole magnetic blocks.

The present invention is characterized in that: a controller controls the phase difference between a first phase signal and a second phase signal in the course of creating the first phase signal code table and the second phase signal code table such that no longer is any highly precisely means, such as special clamps, required to install magnetic sensing components in place, thereby overcome the known drawbacks of the prior art regarding the installation of magnetic sensing components.

To meet the requirements of the present invention, it is feasible to adopt a conventional 8-bit or 16-bit micro-control unit (MCU) and thus cut costs greatly by dispensing with any dedicated decoding chip, such as Melexis Triaxis MLX90316.

In conclusion, a non-contact adjustable hysteretic magnetic encoder of the present invention is characterized in that: the phase difference between a first phase signal and a second phase signal is adjusted, and a hysteresis range, also known as hysteresis angle, is adjusted, according to the grids attributed to the predetermined number of grids before the turning point and the grids attributed to the predetermined number of grids after the turning point. Hence, the non-contact adjustable hysteretic magnetic encoder features enhanced potential of expansion and marked industrial practicability.

BRIEF DESCRIPTION

Objectives, features, and advantages of the present invention are hereunder illustrated with specific embodiments in conjunction with the accompanying drawings, in which:

FIG. 2 (b) is a schematic view of the non-contact adjustable hysteretic magnetic encoder and the rotating shaft according to another embodiment of the present invention;

FIG. 2 (c) is an output waveform diagram of two magnetic sensing components according to an embodiment of the present invention;

FIG. 2 (d) is a diagram of the combination of the output waveforms of the two magnetic sensing components of FIG. 2 (c)

DETAILED DESCRIPTION

Figure 1:
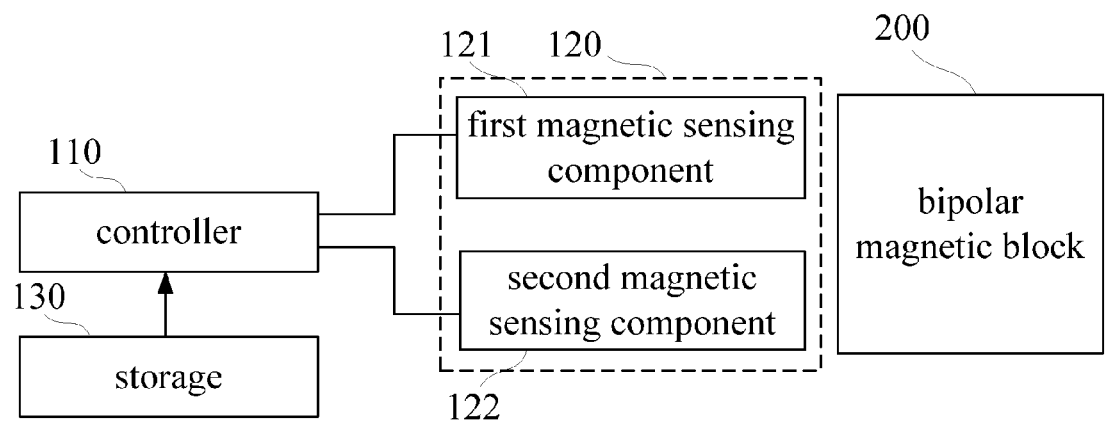
FIG. 1 is a function block diagram of a non-contact adjustable hysteretic magnetic encoder according to an embodiment of the present invention.
Figure 2A:
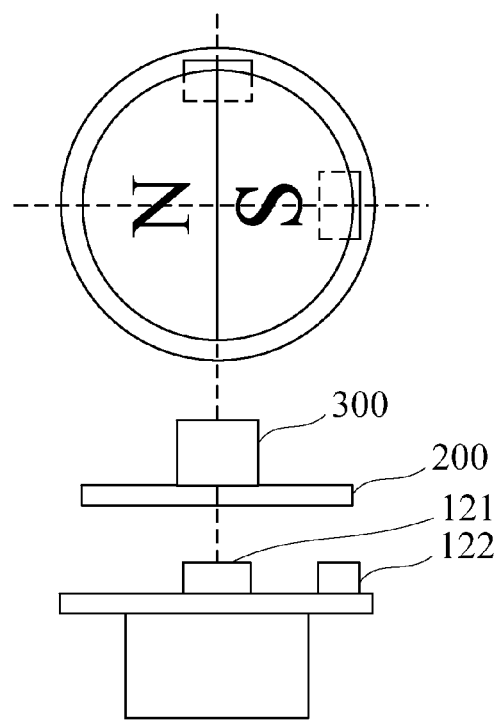
FIG. 2 (a) is a schematic view of the non-contact adjustable hysteretic magnetic encoder and a rotating shaft according to an embodiment of the present invention.
Figure 2B:
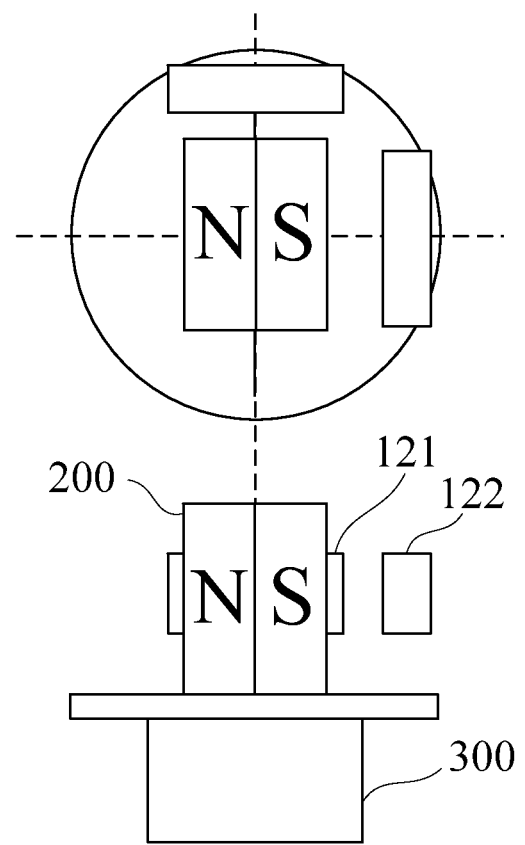
Figure 2C:
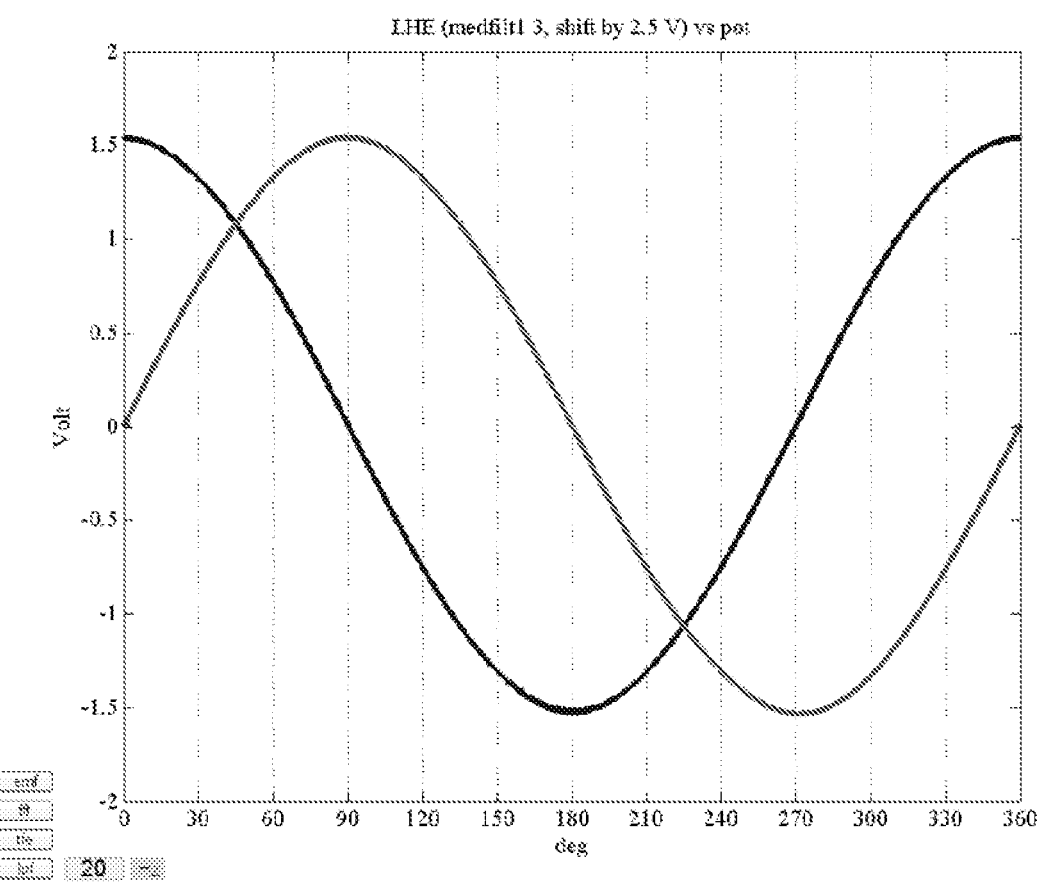
Figure 2D:
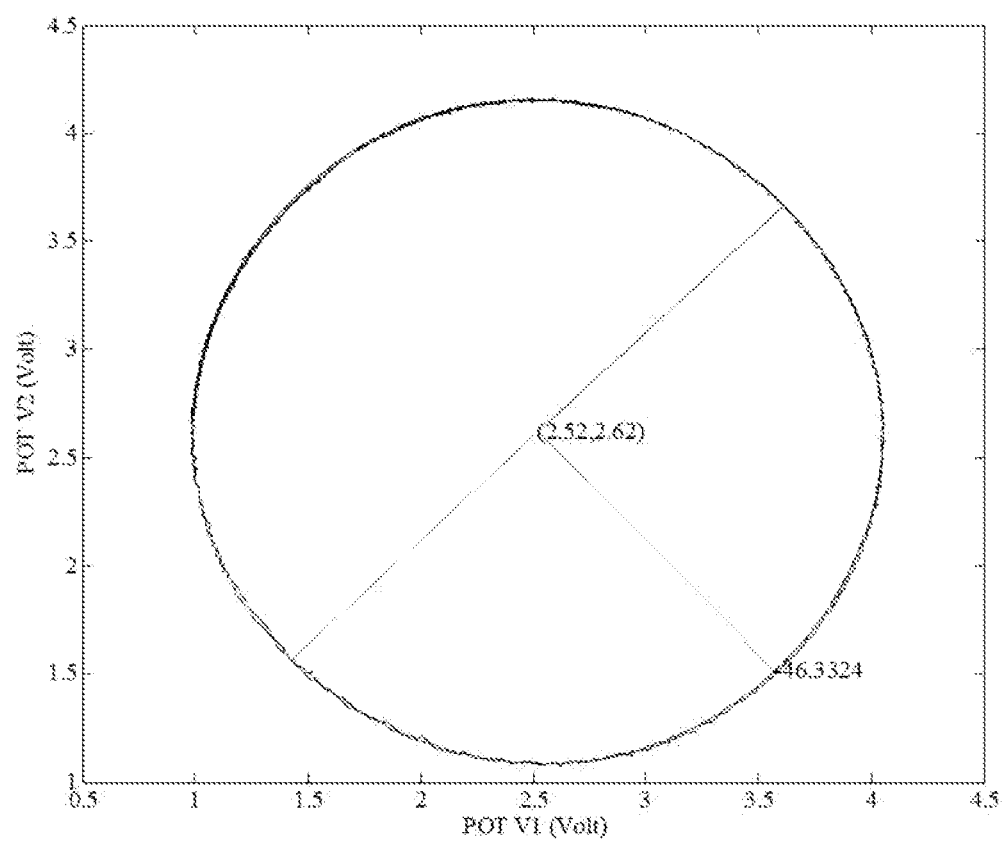
Figure 3A:
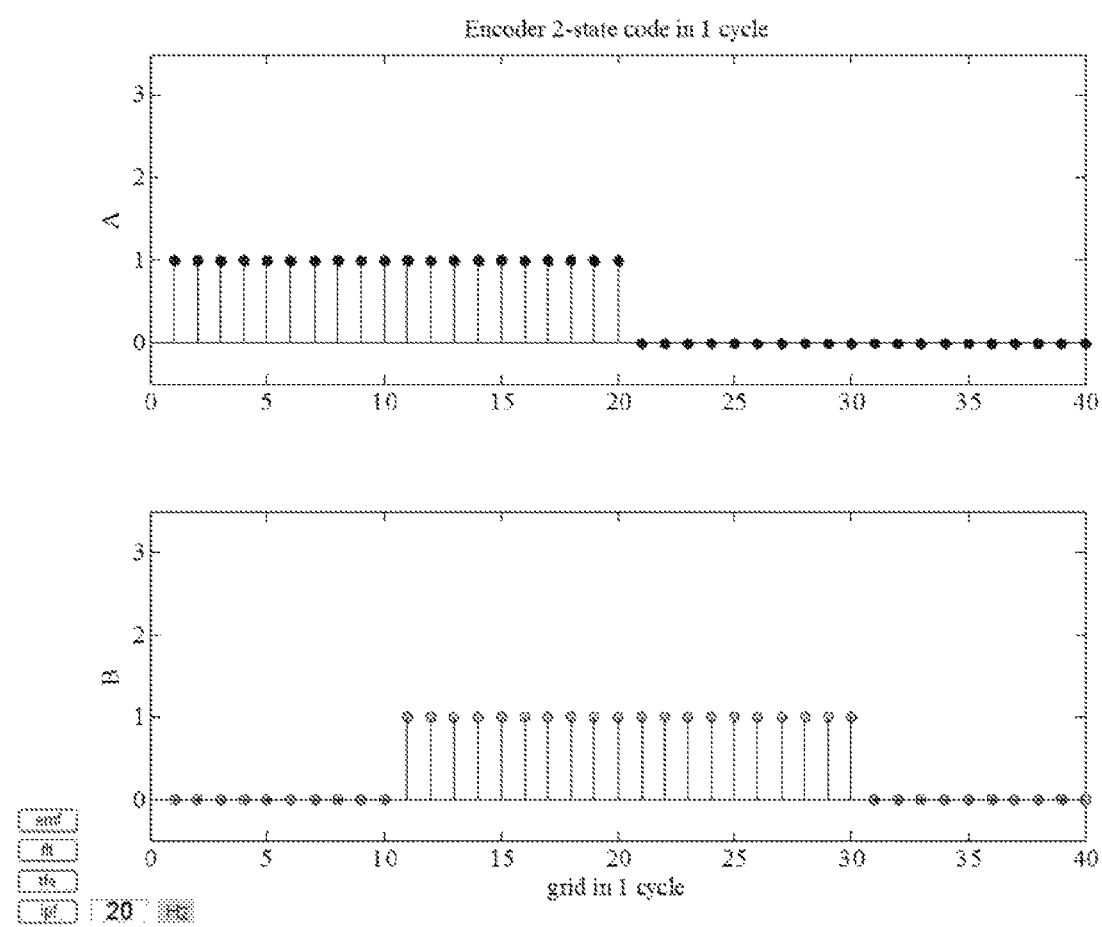
FIGS. 3 (a)~(j) are schematic views of code adjustment performed in the course of creating a phase signal code table according to an embodiment of the present invention.
Figure 3B:
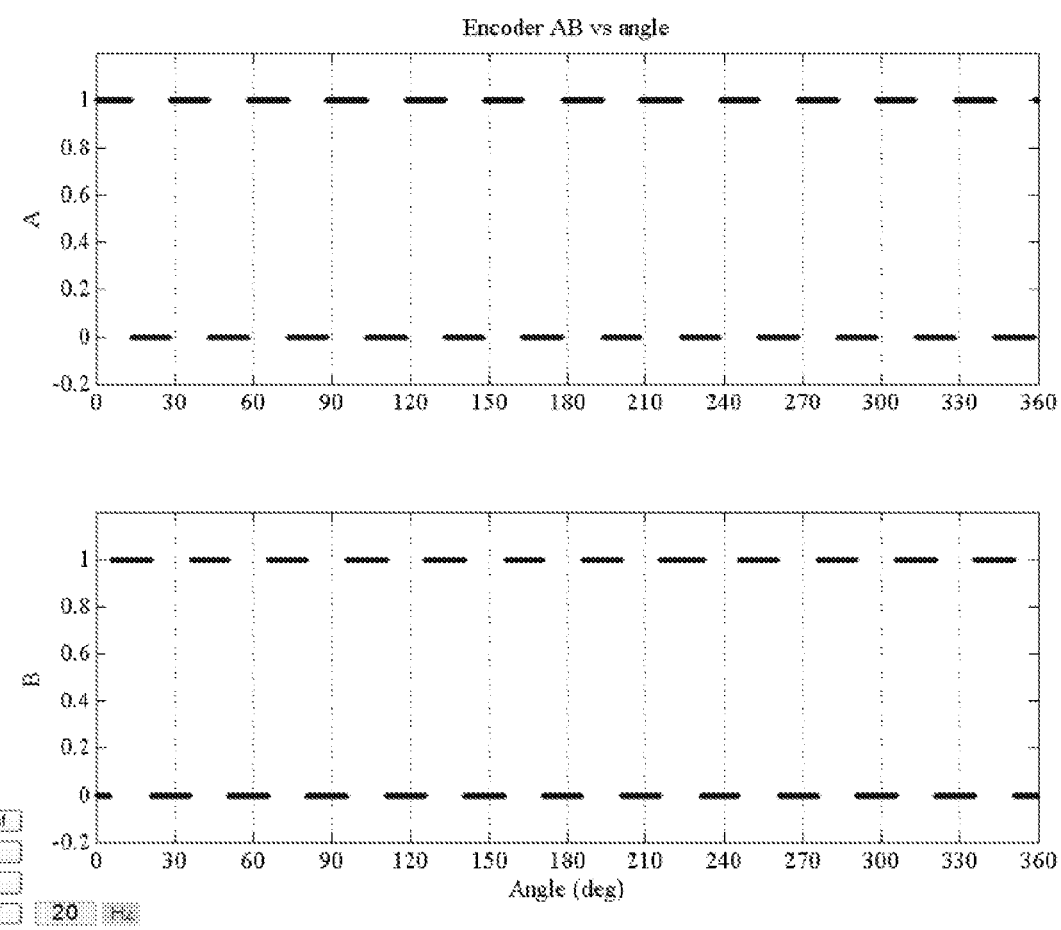
Figure 3C:
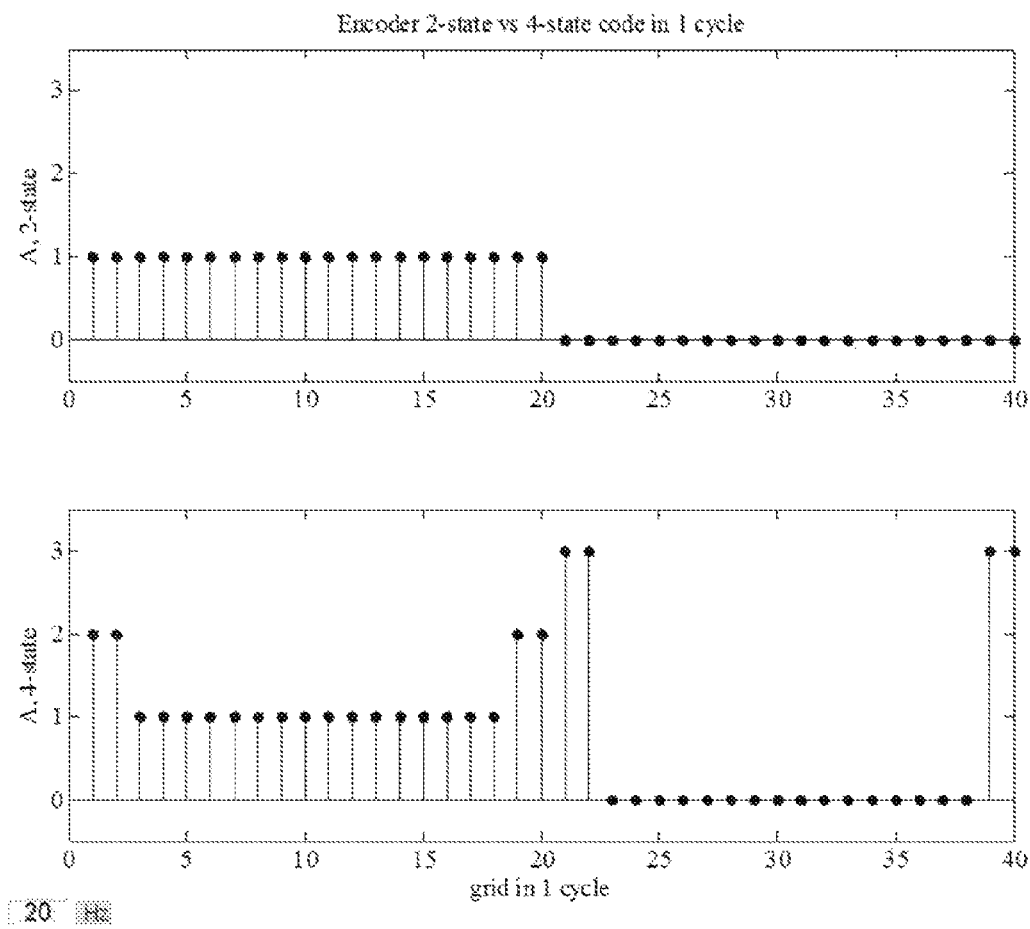
Figure 3D:
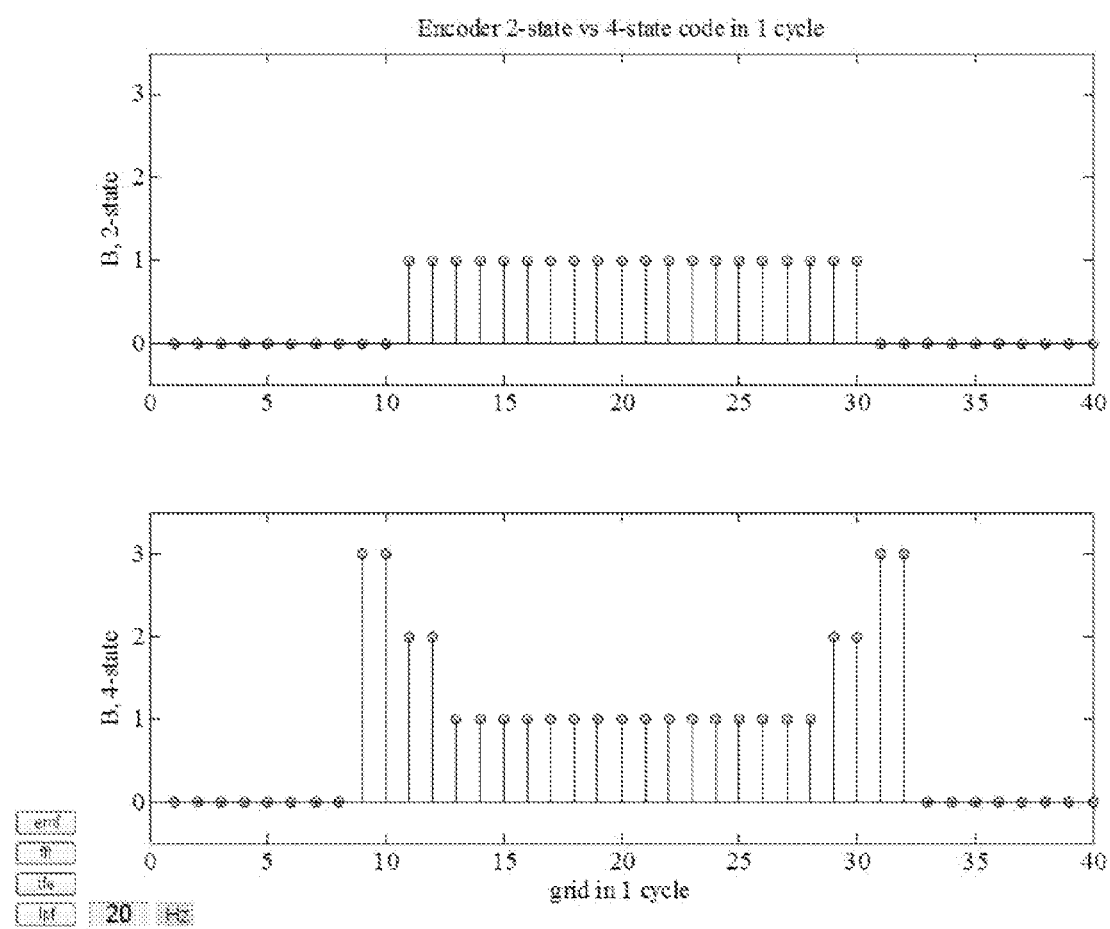
Figure 3E:
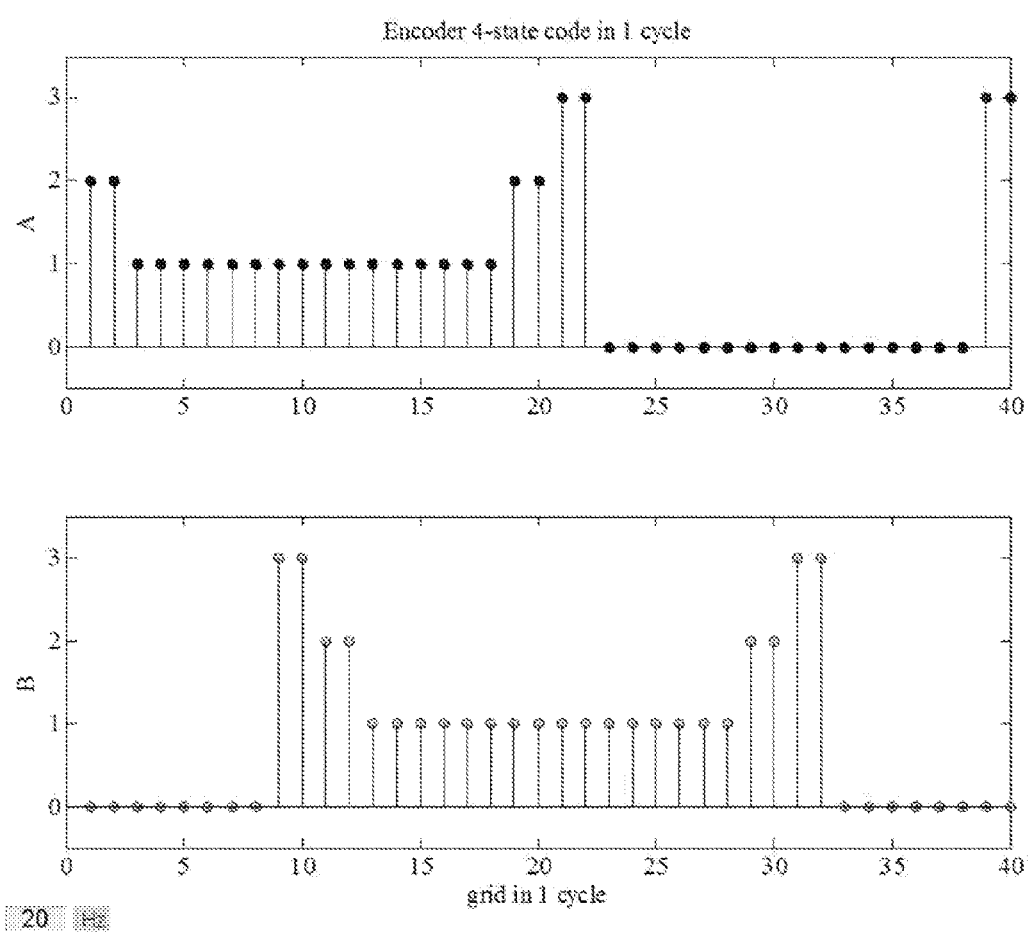
Figure 3F:
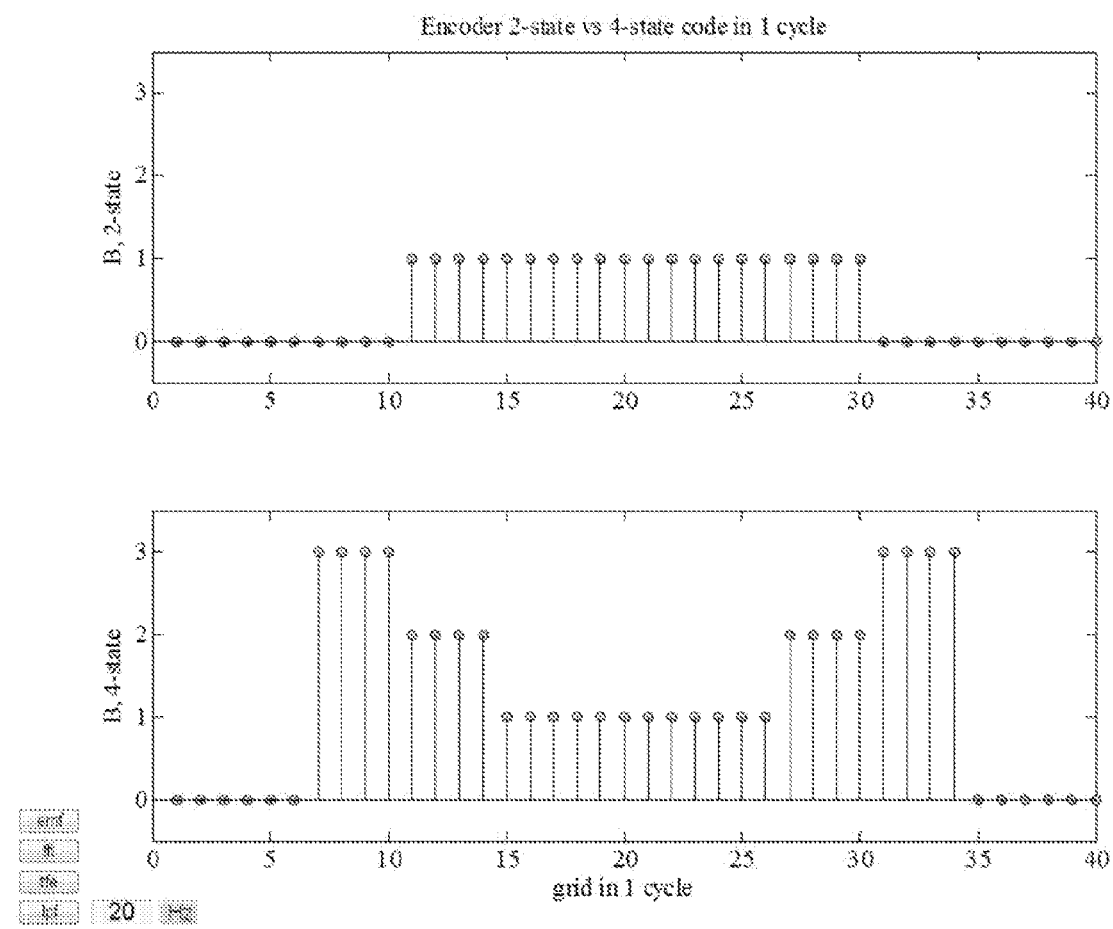
Figure 3G:
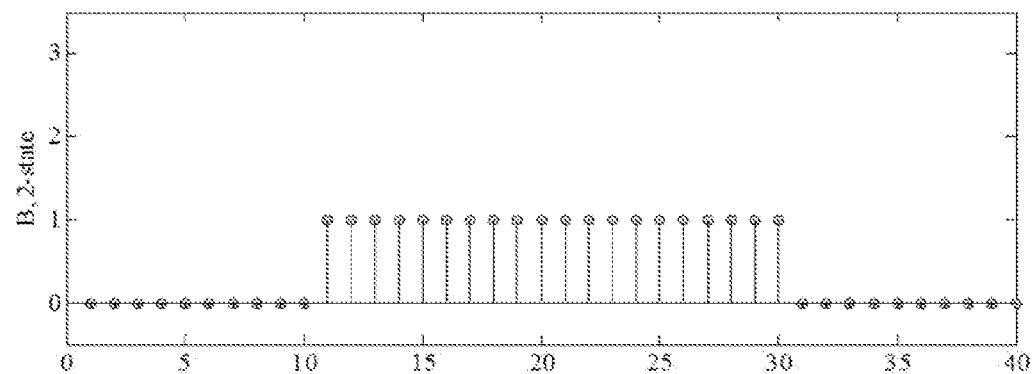
Figure 3G:
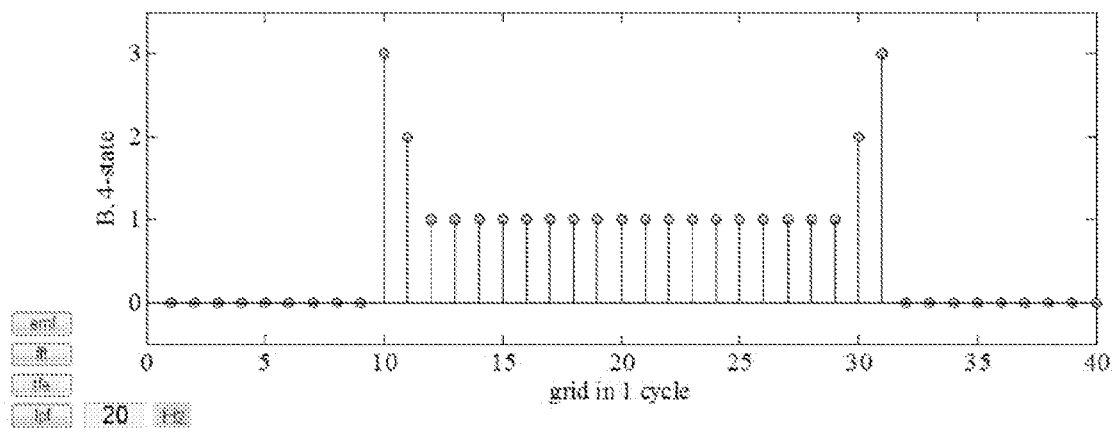
Figure 3H:
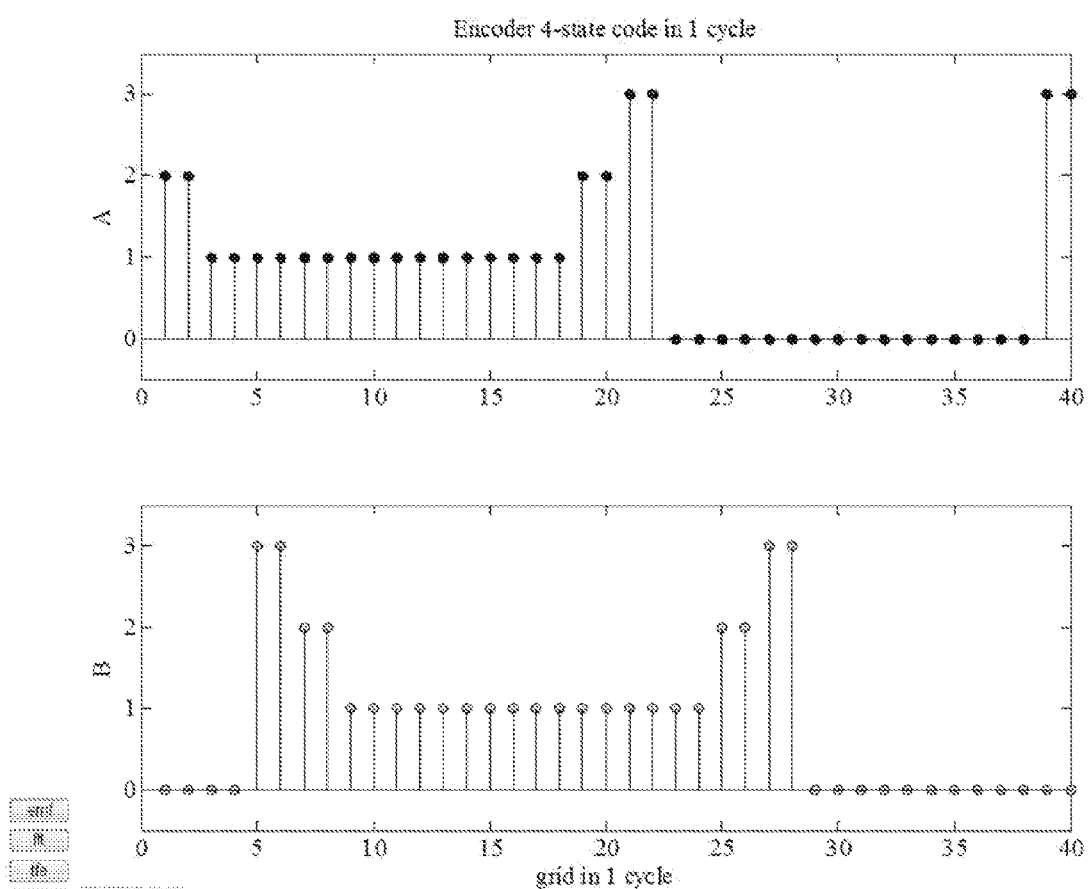
Figure 3I:
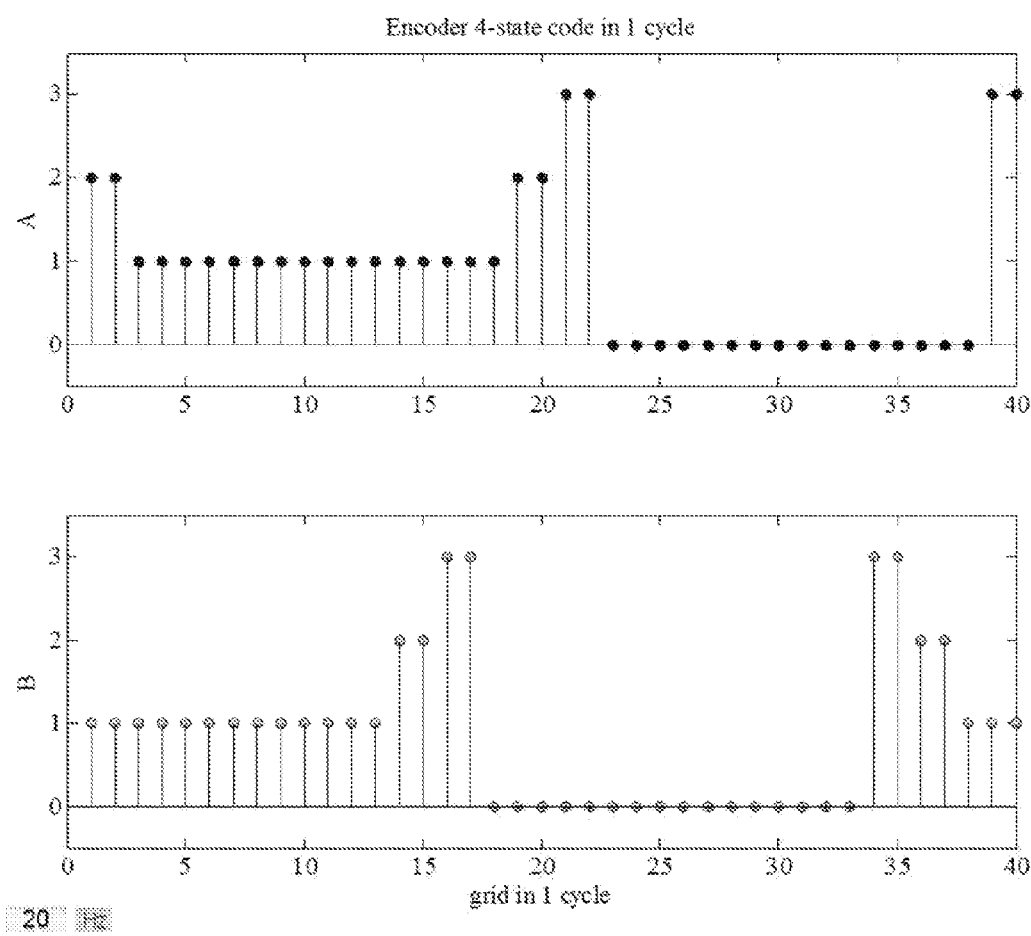
Figure 3J:
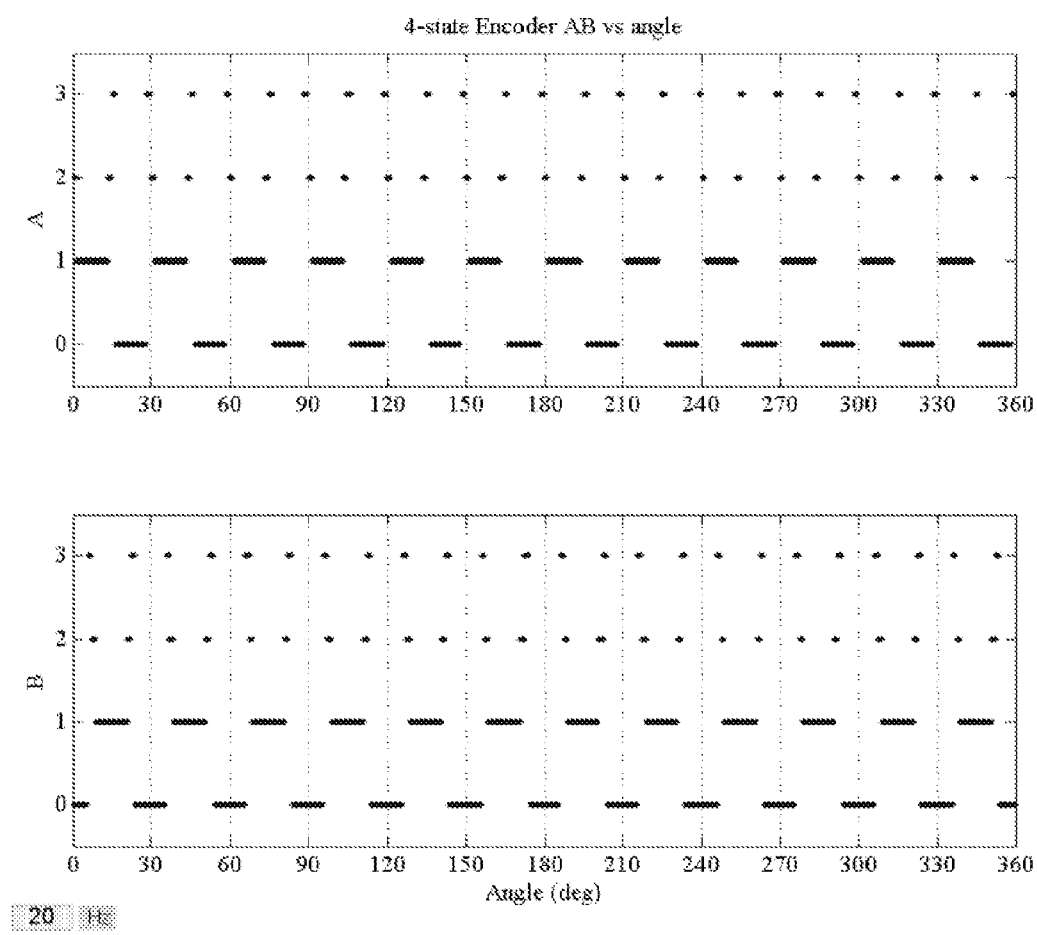

Referring to FIG. 1, there is shown a function block diagram of a non-contact adjustable hysteretic magnetic encoder according to an embodiment of the present invention. According to the present invention, the non-contact adjustable hysteretic magnetic encoder comprises a bipolar magnetic block 200, two magnetic sensing components 120 (a first magnetic sensing component 121 and a second magnetic sensing component 122), a storage 130, and a controller 110.

The bipolar magnetic block 200 is disposed at a rotating shall of a rotation driving apparatus (shown in FIG. 2). The two magnetic sensing components 120 are disposed in the vicinity of the bipolar magnetic block 200 and spaced apart from each other by a predetermined distance, such that it is feasible to generate two induction signals which differ from each other by a first predetermined phase by sensing the magnetic field of the bipolar magnetic block 200.

The storage 130 stores therein a rotation angle table, a first phase signal code table, and a second phase signal code table. The rotation angle table shows the rotation angle of the rotating shaft when referring to each combination of the two induction signals, such as each combination of voltages. The first phase signal code table and the second phase signal code table show the operating state of a first phase signal and the operating state a second phase signal, respectively, when referring to each rotation angle of the rotating shaft.

The controller 110 is connected to the two magnetic sensing components 120 and the storage 130 so as to receive the two induction signals, receive data indicative of a rotation angle of the rotating shaft in accordance with the rotation angle table stored in the storage 130, determine and send the data indicating the rotation angle and acquired in accordance with the rotation angle table, and eventually determine and send digital logical values of the first phase signal and the second phase signal in accordance with an encoding rule set forth in the first phase signal code table and the second phase signal code table. The encoding rule requires the controller 110 to send a first digital logical value when the phase signal code is a first state, send a second digital logical value when the phase signal code is a second state, and send a digital logical value corresponding to a preceding code when the phase signal code is a third or fourth state. For example, the first digital logical value is 0, whereas the second digital logical value is 1, or vice versa.

Furthermore, under the encoding rule, the controller 110 generates the second digital logical value when the code is in the third state and generates the first digital logical value when the code is in the fourth state on condition that the code is not preceded by any code.

Referring to FIG. 2 (a) and FIG. 2 (b), there are shown schematic view of the non-contact adjustable hysteretic magnetic encoder and a rotating shaft according to different embodiments of the present invention. FIG. 2 (a) is a schematic view which shows that the bipolar magnetic block 200 is a radial magnetization a magnetic block. FIG. 2 (b) is a schematic view which shows that the bipolar magnetic block 200 is an axial magnetization a magnetic block. FIG. 2 (a) and FIG. 2 (b) are a side view and a top view, respectively.

Referring to FIG. 2 (a), the two magnetic sensing components 121, 122 are spaced apart by a predetermined angle centered at the rotating shaft 300. Due to the predetermined angle, two induction signals generated from the two magnetic sensing components 121, 122 differ from each other by a first predetermined phase which preferably equals 90 degrees, such that the two magnetic sensing components 121, 122 are spaced apart by 90 degrees. Referring to FIG. 2 (a), the magnetic block 200 is magnetized in the direction perpendicular to the rotating shaft 300, and thus the two magnetic sensing components 121, 122 generate induction signals in accordance with its output voltage in response to the magnetic field of the bipolar magnetic block 200. Referring to FIG. 2 (b), with reference to the bipolar magnetic block 200 relative to the rotating shaft 300, the principles of the magnetic induction of the bipolar magnetic block 200 and the two magnetic sensing components 121, 122 are similar to that shown in FIG. 2 (*a*). Each magnetic sensing component is exemplified by a linear Hall element (LHE).

Referring to FIG. 2 (*c*), there is shown an output waveform diagram of two magnetic sensing components according to an embodiment of the present invention. Since the first predetermined phase preferably equals 90 degrees as shown in FIG. 2 (*a*) and FIG. 2 (*b*), the relationship between the output waveform of the two magnetic sensing components 121, 122 and the rotation angle of the rotating shaft approximates to the relationship between a sine wave and a cosine wave which differ from each other by a phase difference of 90 degrees. The induction signals generated from the two magnetic sensing components 121, 122 are treated as X-axis and Y-axis, and their results approximate to a circle, as illustrated with FIG. 2 (*d*) which shows a diagram of the combination of the output waveforms of the two magnetic sensing components.

Referring to FIG. 2 (*c*), the rotation angle table of the present invention is predefined with the range of induction signals (expressed in terms of voltage) generated from the two magnetic sensing components 121, 122 at each angle of the rotating shaft. Upon completion of the definition, it is practicable to begin creating the rotation angle table. Afterward, the controller 110 determines a rotation angle by referring to the rotation angle table and the induction signals generated from the two magnetic sensing components 121, 122. In the aforesaid step of creating the rotation angle table, it is practicable to ensure the precision of a rotation angle with an external angle detection device (for example, a detection device which comes with an angle resolver) or dispense with any external angle detection device by using the voltage levels of the induction signals and related trigonometric functions to infer the rotation angle, wherein the trigonometric functions are exemplified by Vx=V0 sin (α), Vy=V0 cos (α), where α denotes the rotation angle. The reason why it is feasible to infer the rotation angle α with the trigonometric functions is that the output waveforms of the two magnetic sensing components 121, 122 approximate to a sine wave and a cosine wave which differ from each other by a phase difference of 90 degrees.

The first phase signal code table and the second phase signal code table are defined in a manner that a range of rotation angles of the first phase signal and the second phase signal is divided into a plurality of cycle of pulses and the cycle of pulses are each divided into a plurality of grids. The cycle of pulses of the first phase signal and the second phase signal differ by a second predetermined phase. Every turning point within each cycle of pulse is defined with a hysteresis defining rule. The hysteresis defining rule requires that both the state of the turning point and the state of the grids attributed to the predetermined number of grids before the turning point be defined as the third state when the state of the grids attributed to the predetermined number of grids before the turning point and the grids attributed to the predetermined number of grids after the turning point is the second state. Furthermore, the hysteresis defining rule requires that both the state of the turning point and the state of the grids attributed to the predetermined number of grids before the turning point be defined as the fourth state when the state of the grids attributed to the predetermined number of grids before the turning point and the grids attributed to the predetermined number of grids after the turning point is the first state. The aforesaid technical features are illustrated with the diagrams below.

Referring to FIG. 2 (*c*), according to the present invention, the pulses per round (ppr) of the encoder is denoted with N. Referring to FIG. 2 (*d*), the horizontal axis (angle) is divided into N segments, and preferably 12 segments, wherein each segment is defined with a pulse wave, and the pulse wave is for use in determining the digital logical signal value of each angle. Hence, each pulse wave segment has a range of 30 degrees as shown in FIG. 2 (*d*).

In each pulse wave segment (30 degrees), there are an A-phase signal (a first phase signal) and a B-phase signal (a second phase signal.) According to the present invention, each pulse wave segment s further divided into N gpc segments, wherein gpc denotes grids per cycle. In this regard, each pulse wave segment has 40 grids per cycle, that is, N=40, for the sake of illustration. Since a revolution has 12 pulse wave segments (12*30=360 degrees), the angle of each gpc segment equals 0.75 degree (360/(12*40)). If N=80, then the angle of each gpc segment equals 0.375 degree. The product of pulse "N ppr" and grids "N gpc" equals the total number of grids per revolution. Furthermore, the grids are subject to a limit arising from the bit number of the controller 110. In general, taking the 10-bit controller 110 as an example, it can identify a maximum of 1024 analog voltage levels, because N ppr multiples N gpc equals 1024 to the maximum extent possible. Hence, if N gpc is set to 40, the maximum number of the pulse waves per revolution achievable with the encoder will be 25.6.

Referring to FIGS. 3 (*a*)~(*e*), there are shown schematic views of the code adjustment performed in the course of creating the phase signal code table according to an embodiment of the present invention.

Referring to FIG. 3 (*a*), there is shown a schematic view of the B-phase signal and the A-phase signal of each cycle of pulse, wherein a revolution (360 degrees) yields N ppr cycle of pulses, wherein the A-phase signal has a logical signal value of 1 in the first half of each cycle of pulse wave and has a logical signal value of 0 in the second half of each cycle of pulse wave, wherein the B-phase signal and the A-phase signal have a phase difference of 90 degrees (one-fourth of a cycle). Referring to FIG. 2 (*c*), the 40 grids in each pulse wave segment (30 degrees) are configured to carry two pieces of data, that is, state 0 and state 1 as shown in FIG. 3 (*a*) so that the controller 110 can output N ppr pulse waves per revolution as shown in FIG. 3 (*b*).

A conventional switch for use in digital output is always characterized by hysteresis to thereby preclude any rapid change in an output between state 0 and state 1 when the switching process happens to occur at a turning point. The present invention further discloses that the aforesaid two states of code, i.e., 0 and 1, are replaced with four states, namely 0, 1, 2 and 3. For illustrative sake, the first state is hereunder denoted with 0, the second state with 1, the third state with 2, and the fourth state with 3. First, it is necessary to identify the location at which 1 turns into 0 and 0 into 1 by the aforesaid 2-state encoding rule. As a result, FIG. 3 (*c*) shows that it is the 20$^{th}$ segment at which 1 turns into 0, and the 40$^{th}$ segment at which 0 turns into 1. If each cycle of pulse wave has a segment number of Ngpc, then the turning points will be located at Ngpc/2 and Ngpc, respectively. If Ngpc=40, as mentioned above, then the turning points will be located at the 20$^{th}$ segment and the 40$^{th}$ segment, respectively.

The present invention is further characterized in that the hysteresis defining rule requires that intervals of hysteresis are configured in the course of creating the first phase signal code table and the second phase signal code table by setting the hysteretic grid number Nhys, such that the intervals of hysteresis are expressed with the grid number Nhys before and behind the turning point.

The hysteresis defining rule further governs the state of the grid number Nhys before and behind the turning point (because there are a total of two 2 Nhys grids before and behind a turning point.) In this regard, the first defining criterion is: if "the front Nhys grid" (inclusive of the turning point per se) or "the rear Nhys grid" (exclusive of the turning point per se) of the turtling point has a state of 1, and either of these two states is true, then "the front Nhys grid" (inclusive of the turning point per se) of the turning point will have a state of 2. The second defining criterion is: if "the front Nhys grid" (inclusive of the turning point per se) or "the rear Nhys grid" (exclusive of the turning point per se) of the turning point has a state of 0, and either of these two states is true, then "the front Nhys grid" (inclusive of the turning point per se) of the turning point will have a state of 3. Referring to the upper diagram in FIG. 3 (c), it shows that, by the initial 2-state rule, the code of the A-phase signal has a state of 1 in the first half of a cycle of pulse wave and has a state of 0 in the second half of a cycle of pulse wave. In this embodiment, the Nhys is set to 2, and the result of the 4-state code of the A-phase signal is shown in the lower diagram of FIG. 3 (c). The two grids before and behind the turning point are in state 2 instead of the initial state 1 and in state 3 instead of the initial state 0, respectively. FIG. 3 (d) shows the results of the 2-state code and 4-state code of the B-phase signal. FIG. 3 (e) shows the results of the 4-state code of the A-phase signal and the B-phase signal.

The extent of the hysteresis of a conventional digital switch is determined by circuit hardware. Unlike the prior art, the present invention provides a non-contact adjustable hysteretic magnetic encoder advantageously characterized in that the extent of its hysteresis is determined with software in the course of creating the first phase signal code table and the second phase signal code table, simply by adjusting the hysteretic grid number Nhys. Referring to FIG. 3 (c) and FIG. 3 (d), its hysteretic grid number is 2, and thus there are two segments to the left of the turning point and two segments to the right of the turning point, indicating that the hysteresis covers the four segments. Referring to FIG. 3 (c) and FIG. 3 (d), the grid Ngpc of each cycle of pulse wave equals 40, and each revolution has 12 pulse wave grids, i.e., Nppr=12; hence, each segment has an angle of 0.75 degree and has a hysteretic range of 3 degrees. Accordingly, the present invention is advantageously characterized in that Nhys is indicative of the adjusted hysteretic range.

Referring to FIG. 3 (f), there is shown a schematic view of the waveform of the 4-state code within a single cycle of pulse wave of the A-phase signal and the B-phase signal in the situation where the hysteretic grid number is set to 4. Referring to FIG. 3 (g), there is shown a schematic view of the waveform of the 4-state code within a single cycle of pulse wave of the A-phase signal and the B-phase signal in the situation where the hysteretic grid number is set to 1. Accordingly, to adjust a hysteretic angle, all it needs to do is to set the hysteretic grid number Nhys.

In addition, the non-contact adjustable hysteretic magnetic encoder of the present invention is further characterized in that the phase difference between its A-phase signal and B-phase signal can be configured by software at the point in time when the first phase signal code table and the second phase signal code table are created. To configure the phase difference between the A-phase signal and the B-phase signal, all it needs to do is adjust the phase difference by adjusting the second predetermined phase, wherein the minimum graduation for the aforesaid adjustment is the angle of one grid. Referring to FIG. 3 (h), there is shown a schematic view of the waveform of the four-state code of a single cycle of pulse wave of the B-phase signal which lags behind the A-phase signal by 45 degrees. Referring to FIG. 3 (i), there is shown a schematic view of the waveform of the four-state code of a single cycle of pulse wave of the B-phase signal which leads the A-phase signal by 45 degrees. As shown in FIG. 3 (h) and FIG. 3 (i), the hysteretic grid number (Nhys) is set to 2.

After the first phase signal code table and the second phase signal code table have been created, the drafting of the diagram of the A-phase signals and the B-phase signals corresponding to the 4-state code table of one revolution (360 degrees) of the rotation angle is finalized as shown in FIG. 3 (j). Hence, after the controller 110 has fetched the current rotation angle from the rotation angle table, it can determine and send the digital logical values of the first phase signal (A-phase signal) and the second phase signal (B-phase signal) in accordance with the encoding rule, so as to finalize the encoding process.

In conclusion, the present invention is characterized in that: the phase difference between a first phase signal and a second phase signal is adjusted, and a hysteresis range, also known as hysteresis angle, is adjusted, according to the grids attributed to the predetermined number of grids before the turning point and the grids attributed to the predetermined number of grids after the turning point. Hence, the non-contact adjustable hysteretic magnetic encoder of the present invention features enhanced potential of expansion as well as marked industrial practicability and thus remarkably involves an inventive step over the prior art.

The above description of the present invention focuses on its principles and advantages in terms of a rotation mechanism. In practice, the framework of the present invention is also applicable to a linear rail sliding mechanism. The present invention is disclosed above by preferred embodiments. However, persons skilled in the art should understand that the preferred embodiments are illustrative of the present invention only, but should not be interpreted as restrictive of the scope of the present invention. Hence, all equivalent variations and replacements made to the aforesaid embodiments should fall within the scope of the present invention. Accordingly, the legal protection for the present invention should be defined by the appended claims.

What is claimed is:

1. A non-contact adjustable hysteretic magnetic encoder, comprising:
   a bipolar magnetic block disposed at a rotating shaft;
   two magnetic sensing components configured in a manner to generate two induction signals by sensing a magnetic field of the bipolar magnetic block, wherein the two induction signals differ from each other by a first predetermined phase;
   a storage for storing a rotation angle table of rotation angles corresponding to the two induction signals and storing a first phase signal code table and a second phase signal code table indicative of states corresponding to a first phase signal and a second phase signal at each said rotation angle; and
   a controller connected to the two magnetic sensing components and the storage so as to receive the two induction signals, retrieve a rotation angle of the rotating shaft in accordance with the rotation angle table, look up the first phase signal code table and the second phase signal code table for digital logical values corresponding to the first phase signal and the second phase signal in accordance with the rotation angle, and output the digital logical values, wherein the first phase signal code table requires the controller to output a first digital logical value if a code of the first phase signal is in a first state, a second digital logical value if the code of the first phase signal is in a second state, and a digital logical value corresponding to the preceding code if the code of the first phase signal is in a third or fourth state, wherein the second phase signal code table requires the controller to output a first digital logical value if a code of the second phase signal is in a first state, a second digital logical value if the code of the second phase signal is in a second state, and a digital logical value corresponding to the preceding code if the code of the second phase signal is in a third or fourth state.

2. The non-contact adjustable hysteretic magnetic encoder of claim 1, wherein, the controller outputs the second digital logical value on condition that the code of the first phase signal is in a third state and the code is not preceded by any code, and the controller outputs the first digital logical value on condition that the code of the second phase signal is in a fourth state and the code is not preceded by any code.

3. The non-contact adjustable hysteretic magnetic encoder of claim 2, wherein the first phase signal code table and the second phase signal code table are defined in a manner that a range of rotation angles of the first phase signal and the second phase signal is divided into a plurality of cycles of pulse wave and the cycles of pulse wave are each divided into a plurality of grids, wherein the cycle of pulse wave of the first phase signal and the second phase signal differ by a second predetermined phase, wherein every turning point within each cycle of pulse wave is defined with a hysteresis defining rule, wherein the hysteresis defining rule requires that both the state of the turning point and the state of the grids attributed to the predetermined number of grids before the turning point be defined as the third state when the state of the grids attributed to the predetermined number of grids before the turning point and the grids attributed to the predetermined number of grids after the turning point s the second state, wherein the hysteresis defining rule requires that both the state of the turning point and the state of the grids attributed to the predetermined number of grids before the turning point be defined as the fourth state when the state of the grids attributed to the predetermined number of grids before the turning point and the grids attributed to the predetermined number of grids after the turning point is the first state.

4. The non-contact adjustable hysteretic magnetic encoder of claim 3, wherein the first predetermined phase and the second predetermined phase differ from each other by a phase difference of 90 degrees.

5. The non-contact adjustable hysteretic magnetic encoder of claim 3, wherein each said magnetic sensing component is a linear Hall element.

* * * * *